United States Patent

Zushi et al.

[11] Patent Number: 5,118,133
[45] Date of Patent: Jun. 2, 1992

[54] RETAINER USED FOR AIR BAG

[75] Inventors: Takayasu Zushi; Masami Sawada; Yuichi Nanbu, all of Shiga; Yasuo Ito, Aichi, all of Japan

[73] Assignee: Takata Corporation, Tokyo, Japan

[21] Appl. No.: 561,618

[22] Filed: Aug. 1, 1990

[30] Foreign Application Priority Data

Aug. 22, 1989 [JP] Japan .................. 1-215609

[51] Int. Cl.⁵ .............................. B60R 21/16
[52] U.S. Cl. ...................... 280/728; 280/742
[58] Field of Search ........ 280/743, 728, 730–732; 428/285

[56] References Cited

U.S. PATENT DOCUMENTS

| 4,315,967 | 2/1982 | Prior et al. | 428/285 |
| 4,647,213 | 3/1987 | Hay | 252/628 |
| 4,852,907 | 8/1989 | Shiraki et al. | 280/743 |
| 4,878,689 | 11/1989 | Mitzkus et al. | 280/743 |
| 4,989,897 | 2/1991 | Takada | 280/743 |

FOREIGN PATENT DOCUMENTS 1396635 6/1975 United Kingdom.
2228235 8/1990 United Kingdom.

Primary Examiner—Charles A. Marmor
Assistant Examiner—Paul Dickson
Attorney, Agent, or Firm—Kanesaka and Takeuchi

[57] ABSTRACT

A retainer used for an air bag is formed of synthetic resin-impregnated paper. The retainer is reduced in weight, has a shape adaptability and can be served at a reduced cost. Further, the attaching operation is easy to improve productivity.

17 Claims, 9 Drawing Sheets

RETAINER USED FOR AIR BAG

BACKGROUND OF THE INVENTION

Field of the Invention and Related Art Statement

The present invention concerns a retainer used for an air bag and, more in particular, it relates to a retainer used for an air bag made of a specific material.

A steering portion of a vehicle such an automobile is provided with an air bag that expands to inflate when sensing impact shocks, deformations, etc. upon collision of the vehicle.

FIG. 2 is a schematic front elevational view partially in cross section of a structure for attaching an air bag, in which are shown an air bag containing cover 11 (module cover), an air bag 12, a mountain ring 13, a retainer 14 (base plate), an inflator 15 and a rivet 16. The retainer 14 was made by applying electrodeposition coating on a steel sheet (SAP H 45, SPCC, SPCH, etc.) and has a shape as shown in FIG. 3. The retainer made of a steel sheet in the prior art shown in FIG. 3 had a large specific gravity and involved the following problems.

(1) Since the retainer is heavy, attaching operation is not easy, so that productivity becomes poor.
(2) Reduction of weight in the structure for attaching the air bag is hindered.
(3) Since large vibrations are caused and inertia moment is large due to the reason (2) described above, steering performance of the steering wheel is poor.

In addition, the steel sheet retainer requires coating such as electrodeposition coating for preventing rust, which makes the production cost expensive. Furthermore, since the retainer is manufactured by pressing the steel sheet, it also involves a drawback of poor shape adaptibility such as for reinforcement by locally increasing the thickness.

OBJECT AND SUMMARY OF THE INVENTION

It is, accordingly, an object of the present invention to overcome the foregoing problems of the retainer made of a steel sheet in the prior art and to provide a retainer used for an air bag having light weight and shape adaptibility and served at a reduced cost.

Another object of the present invention is to provide a retainer used for an air bag easy to be attached and effective for the improvement of productivity.

The retainer used for an air bag according to the present invention has a feature in which it is constituted with synthetic resin-impregnated paper.

The retainer used for an air bag according to the present invention comprises synthetic resin-impregnated paper and has a reinforcing member inserted therein.

The synthetic resin-impregnated paper usable in the present invention can include paper impregnated with a synthetic resin solution, as well as synthetic pulp, natural pulp, paper dust, wood dust, wood fiber, cellulose fiber, ceramic fiber or glass fiber molded by means of synthetic resin. The synthetic resin-impregnated paper may be incorporated with reinforcing fibers such as nylon, vinylon, alamido fibers or reinforcing particles such as ceramic powder and metal powder.

The reinforcing member may have optional shapes such as a plate or a net and may be made of synthetic resin, rubber or metal. In the case of a plate-like reinforcing member, the thickness is preferably about from 10 μm to 4 mm considering the strength and the weight.

A reinforcing layer may be formed to the surface of the retainer by coating a synthetic resin.

Since the retainer used for an air bag according to the present invention is constituted with synthetic resin-impregnated paper, it has the following merits.

The specific gravity of the synthetic resin-impregnated paper is much lower as compared with that of steel or light weight metal, such as aluminum used for the constituent material for the retainer as shown in the table.

TABLE

| Material | Specific gravity (g/cm³) |
| --- | --- |
| Steel | 7.8 |
| Aluminum | 2.7 |
| Synthetic resin-impregnated paper | 1 |

While the conventional retainer made of steel sheet has a thickness of from 1.2 to 1.6 mm, the retainer made of synthetic resin-impregnated paper in accordance with the present invention usually has a thickness of from 2.3 to 2.7 mm in view of the strength. When the weight of the retainer is compared while considering the thickness, the weight of the retainer made of the synthetic resin-impregnated paper according to the present invention is greatly reduced as low as about ¼ for the weight of the conventional retainer made of a steel sheet as shown in the following table.

TABLE

| Retainer | Weight (g) |
| --- | --- |
| Retainer made of synthetic resin-impregnated paper | 77 |
| Retainer made of steel sheet | 320 |

Accordingly, the retainer attaching operation is easily installed and, since the weight of the air bag attaching structure is reduced, the steering performance can also be improved.

In addition, since the synthetic resin-impregnated paper is free from the problem of rust, it does not need coating and the production cost can be reduced. Further, since the synthetic resin-impregnated paper can easily be shaped into an optional form, it is excellent in shape-adaptibility and local increase of thickness is also easy.

By the way, for attaching the conventional retainer, sealing by disposing a rubber packing (O-ring) to a portion where the retainer abuts against the inflator is necessary with an aim of preventing leakage of a gas jetting out from the inflator upon expansion of the air bag. However, in the retainer made of the synthetic resin-impregnated paper according to the present invention, particularly, in the case of using a thermoplastic resin for the synthetic resin, since the synthetic resin of the retainer is somewhat melted by the heat of the inflator upon expansion of the air bag to seal the abutting portion between the retainer and the inflator, the rubber packing for the sealing as in the prior art is no more necessary.

The reinforcement of the retainer can be improved by inserting the reinforcing member to the synthetic resin-impregnated paper.

As a synthetic resin usable in the present invention, polypropylene, and polyethylene are particularly preferred. In addition, there can be used preferably thermoplastic resins such as EVA resin, nylon resin, PVC resin, etc: thermoplastic resins such as epoxy resin, acryl resin or polyester resin. All of such liquid and solid resins commercially available at present can be used.

In a case of using liquid synthetic resin material, the resin can be impregnated into paper by dipping the paper into the liquid or spraying the liquid on the paper and, thereafter, curing the impregnated synthetic resin by means of heating or photoirradiation. As the liquid resin material, there can be mentioned, for example, epoxy resin, nylon resin, urethane resin, acryl resin or polyester resin.

In the case of impregnating the liquid resin, the resin is impregnated by from 1 to 1000 parts by weight and, preferably, 5 to 200 parts by weight base on 100 parts by weight of paper. As the resin-impregnated paper of this type, there can be mentioned polyolefin synthetic pulp manufactured by Mitsui Petrochemical Co. or polyethylene terephthalate manufactured by Teijin Co.

The retainer according to the present invention is manufactured by shaping such as by pressing the resin-impregnated paper manufactured as described above.

As other methods for manufacturing the resin-impregnated paper, the following methods (A) and (B) can be adopted:

(A) Applying short fibers onto paper with resin coating.

(B) Dispersing fibers into a solution of a resin dissolved in an organic solvent and then applying the solution onto paper.

The retainer according to the present invention is manufactured by drying and heating the resin-impregnated paper made by the process (A) and (B) described above and then molding it by means of pressing or the like.

As further manufacturing methods for the retainer, the following methods (C) and (D) can be adopted.

(C) Casting a resin into a molding die containing fibers.

(D) Casting a mixture of fibers and a resin into a die.

The retainer is manufactured by taking out the content from the die in the method (C) or (D) described above.

Also in the case of manufacturing the retainer by the method (A), (B), (C) or (D), the resin is impregnated in an amount from 1 to 1000 parts by weight, preferably, from 5 to 200 parts by weight based on 100 parts by weight of paper.

DESCRIPTION OF THE PREFERRED EMBODIMENTS

The present invention will now be described specifically by way of preferred embodiments with reference to the drawings.

Figure 1A:
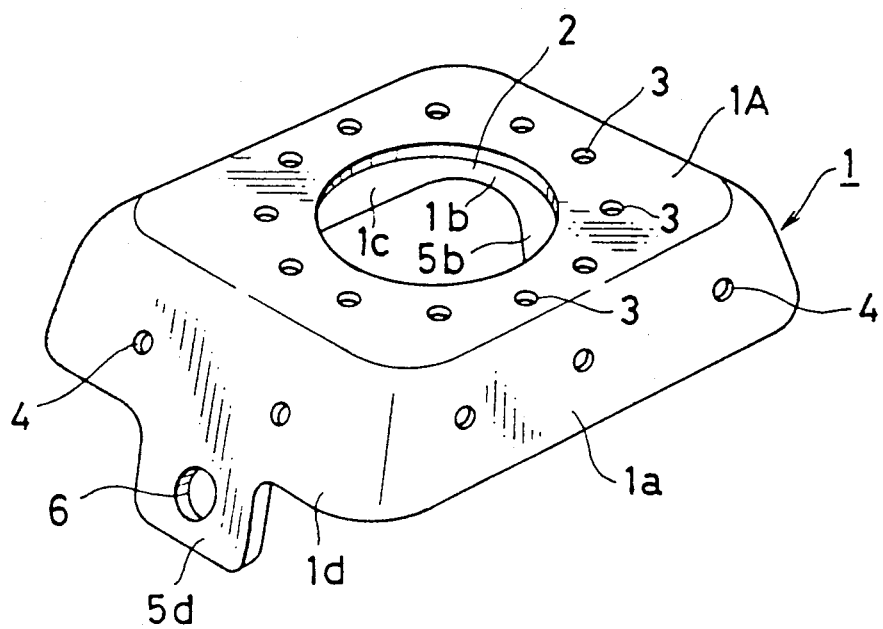
FIG. 1A and FIG. 1B are perspective views showing one embodiment of a retainer used for an air bag according to the present invention.
Figure 1B:
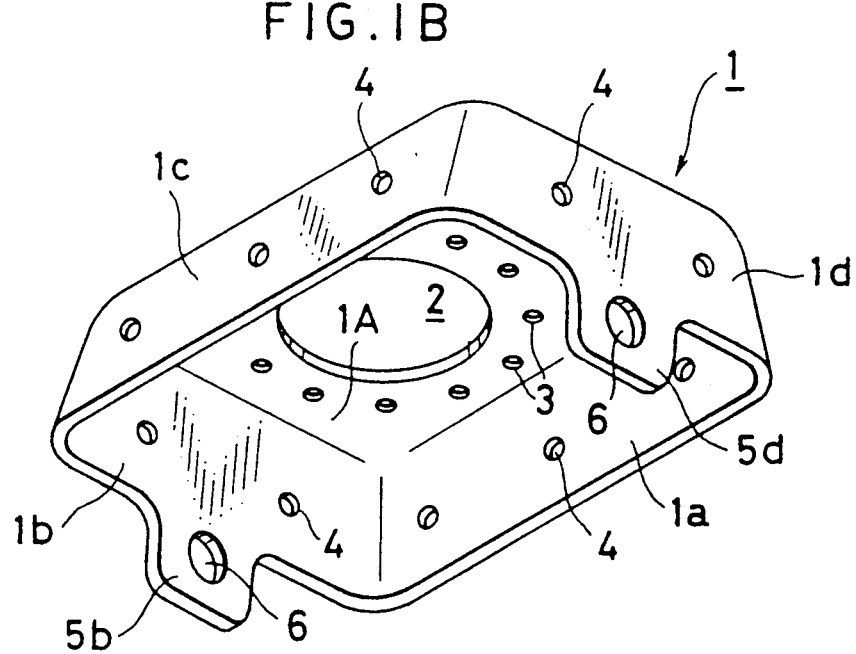

FIG. 1A is a perspective view showing a retainer used for an air bag according to one embodiment of the present invention and FIG. 1B is a perspective view of the retainer observed from below.

Figure 2:
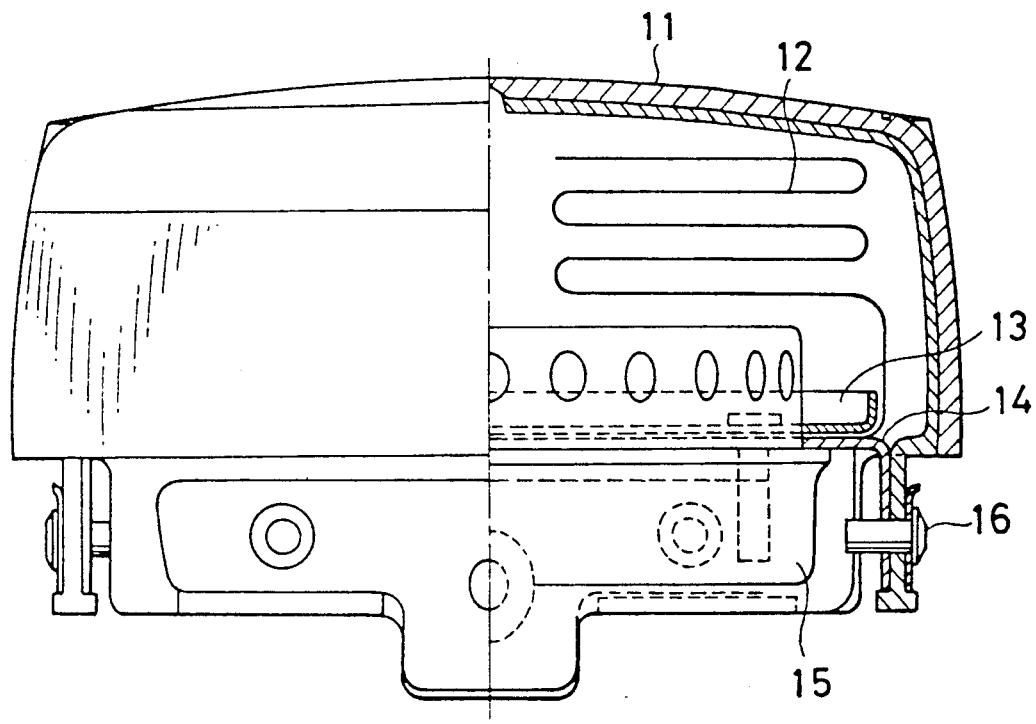
FIG. 2 is a front elevational view partially in cross section showing a structure for attaching an air bag.
Figure 3:
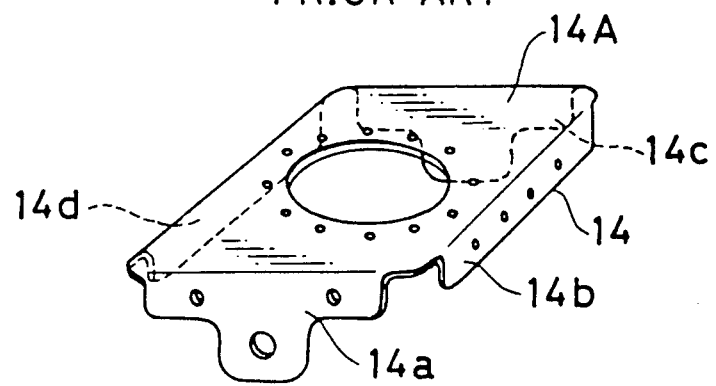
FIG. 3 is a perspective view showing a retainer of the prior art.

A retainer 1 used for an air bag in this embodiment is made of resin-impregnated paper comprising polyolefin synthetic pulp manufactured by Mitsui Petrochemical Co. The retainer 1 is formed as a box-like structure with an aim of ensuring a strength and it comprises a main panel 1A corresponding to the bottom of the box-like structure and side walls 1a, 1b, 1c and 1d standing substantially vertically from four sides of the main panel 1a. The main panel 1a has a hole 2 through which an inflator (15 in FIG. 2) is inserted, and small holes 3 for attaching a mountain ring (13 in FIG. 2) are formed at the periphery of the hole 2. Further, small holes 4 for attaching a module cover (11 in FIG. 2) are disposed to the side walls 1a-1d respectively. Fingers 5b, 5d are extended from the opposing side walls 1b and 1d of the side walls 1a-1d respectively, in which small apertures 6 for attaching to a steering portion are disposed respectively.

Fingers 14a-14d are extended from the main panel 14A in the steel retainer in the prior art. However, since the retainer of the present invention is made of synthetic resin-impregnated paper, a box-like structure as shown in FIGS. 1A and 1B is preferred for securing a sufficient strength.

Figure 4:
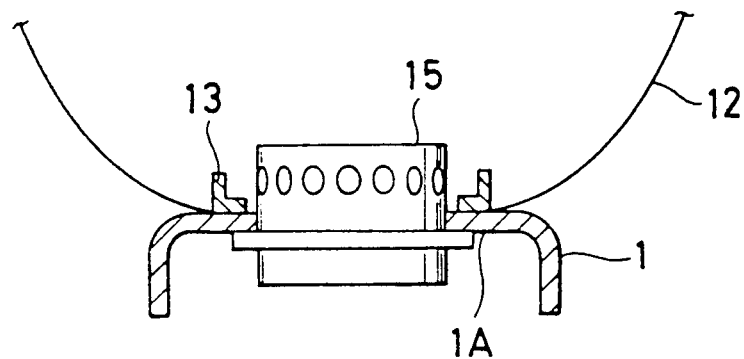
FIG. 4 is a cross sectional view showing a structure of attaching a retainer according to the present invention.

If the retainer 1 is used with the main panel 1A being downside, the side walls 1a-1d may possibly brought into contact with an air bag to cause undesirable effect on inflation of the air bag when operated. It is, accordingly, used with the main panel 1A being upside as shown in FIG. 4. By attaching in this way, when the air bag 12 is developed, the side walls 1a-1d of the retainer 1 is free from contact with the air bag 12 and the air bag 12 can expand satisfactorily. In FIG. 4, are shown a mountain ring 13 and an inflator 15.

The retainer 1 of the box-like structure shown in FIGS. 1A and 1B is tapered by about 4° for mold releasing so as to cope with a molding die. That is, the retainer has a substantially trapezoidal cross section with an angle between the main panel 1A and each of the side walls 1a-1d being about 94°.

The wall thickness of the retainer made of synthetic resin-impregnated paper is usually within a range from 2 to 5 mm and, more preferably, about from 2.3 to 2.7 mm in order to reduce the size and the weight by the reduction of the thickness.

Figure 5:
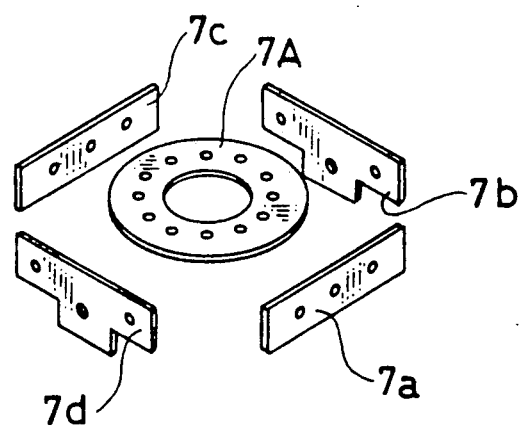
FIG. 5 is a perspective view showing a reinforcing plate.

The retainer made of the synthetic resin-impregnated paper according to the present invention can be improved with the strength by inserting a reinforcing member. The reinforcing member may be disposed so as to provide a sandwich structure for the entire retainer. Alternatively, it may be disposed only for the portions requiring strength, for example, inflator attaching portion, steering attaching portion, rivet caulking portion, cover attaching portion, etc. For instance, reinforcing plates 7A, 7a, 7b, 7c and 7d having holes at corresponding portions as shown in FIG. 5 can be inserted into the retainer 1 as shown FIGS. 1A and 1B.

The retainer made of the synthetic resin-impregnated paper can be manufactured with ease by molding into a desired shape under molding conditions for the synthetic resin employed, fabricating the outer configuration, small holes, etc. by means of press punching, hot pressing, drilling or cutting. In the case of inserting the reinforcing member, the retainer can be manufactured with ease, for example, by a method of preliminarily disposing the reinforcing member in a molding die and casting the molding material into the die.

Description will then be made to the attaching structure between the retainer and the module cover in the present invention.

Since the retainer according to the present invention is made of the synthetic resin-impregnated paper, small apertures (4 in FIGS. 1A and 1B) for attaching the retainer with the module cover may easily suffer from deformation at the attaching portion between the retainer and the module cover and, accordingly, the deformed portion of a rivet (16 in FIG. 2) inserted through the small aperture may freely pass through the hole and the rivet may be detached. It is, accordingly, preferred to employ a structure of reinforcing the small hole portion so that the small hole may not be deformed. Although there is no particular restriction to the reinforcing structure for the small holes, the following structures (1)–(6) can be mentioned specifically. In FIGS. 6A, 6B, 7A, 7B, 8A, 8B, 9A, 9B, 10, 11A, 11B referred to for (1)–(6), there are shown a retainer 1, a module cover 11, a rivet 16, deformed portion 16a of the rivet and a plate 17.

Figure 6A:
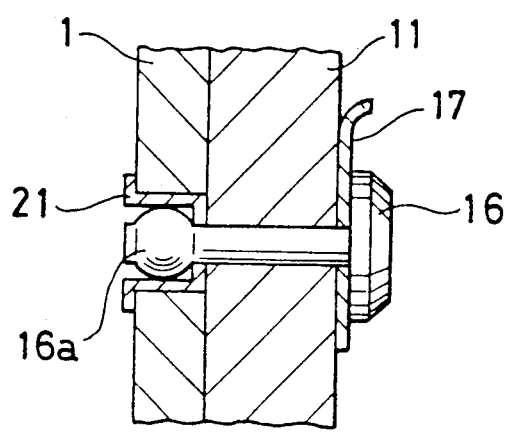
FIG. 6A is a cross sectional view showing one embodiment of a structure for attaching a module cover.
Figure 6B:
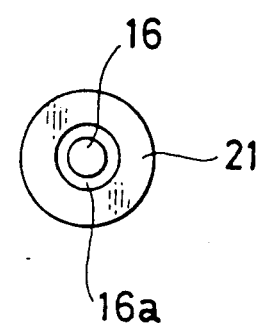
FIG. 6B is a front elevational view of the structure.

(1) A bush 21 as shown in FIG. 6A (cross sectional view) and in FIG. 6B (front elevational view) is attached to the small hole of the retainer 1 such that the bush 21 is put between the retainer 1 and the deformed portion 16a of the rivet 16.

Figure 7A:
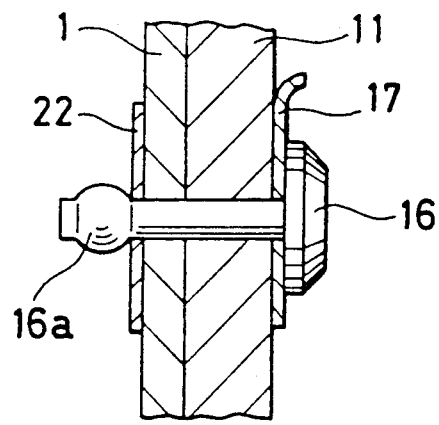
FIG. 7A is a cross sectional view showing another embodiment of a structure for attaching a module cover.
Figure 7B:
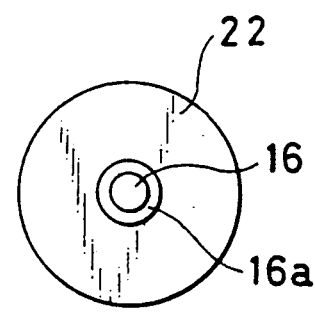
FIG. 7B is a front elevational view of the structure.
Figure 8A:
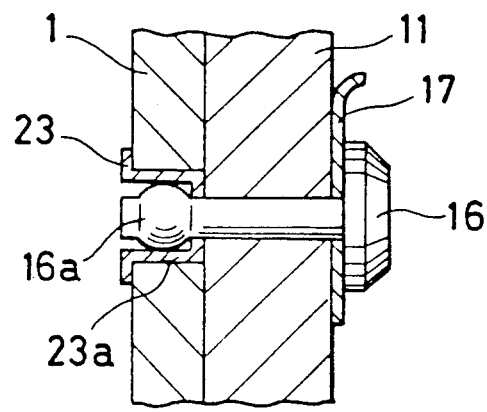
FIG. 8A is a cross sectional view showing a further embodiment of a structure for attaching a module cover.
Figure 8B:
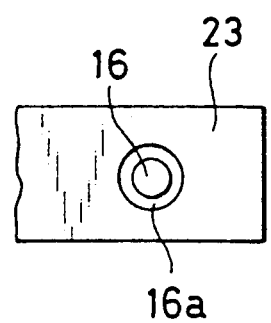
FIG. 8B is a front elevational view of the structure.
Figure 9A:
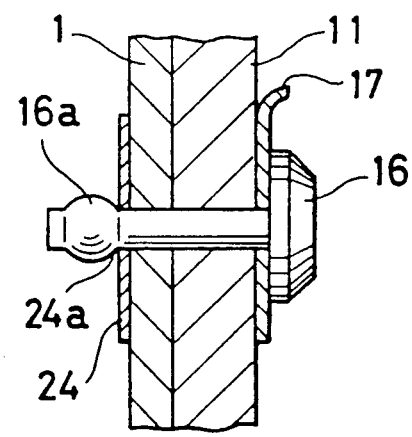
FIG. 9A is a cross sectional view showing a still further embodiment of a structure for attaching a module cover.
Figure 9B:
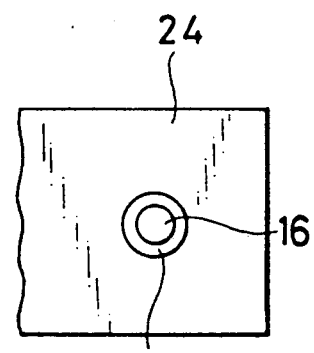
FIG. 9B is a front elevational view of the structure.

(2) A washer 22 as shown in FIG. 7A (cross sectional view) and FIG. 7B (front elevational view) is attached to the small hole of the retainer 1 such that the washer 22 is put between the retainer 1 and the deformed portion 16a of the rivet 16.

(3) A plate 23 having a plurality of bush-shaped portions 23a is attached over a plurality of small holes of the retainer 1 and the bush-shaped plate 23 is put between the retainer 1 and the deformed portion 16a of the rivet 16.

(4) A plate 24 having a plurality of washer-shaped portions 24a is attached over a plurality of small holes of the retainer 1 and the washer-shaped plate 24 is put between the retainer 1 and the deformed portion 16a of the rivet 16.

Figure 10:
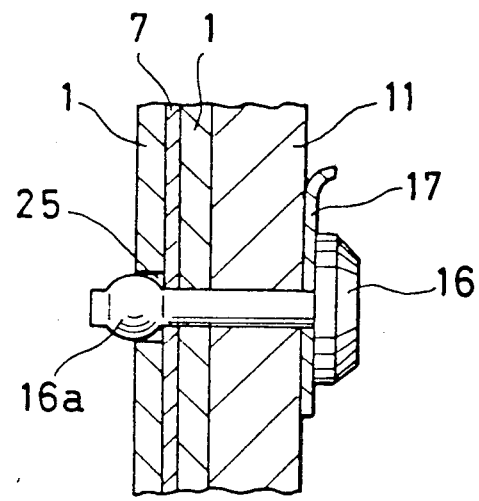
FIG. 10 and FIG. 11A are cross sectional views showing a structure of attaching a module cover.

(5) In a case where the reinforcing plate 7 is inserted in the retainer 1, a hole 25 corresponding to a deformed portion 16a of the rivet of the retainer 1 is formed on the side of the deformed portion 16a such that the reinforcing plate 7 is put between the portion of the synthetic resin-impregnated paper of the retainer 1 and the deformed portion 16a of the rivet 16 as shown in FIG. 10 (cross sectional view).

Figure 11A:
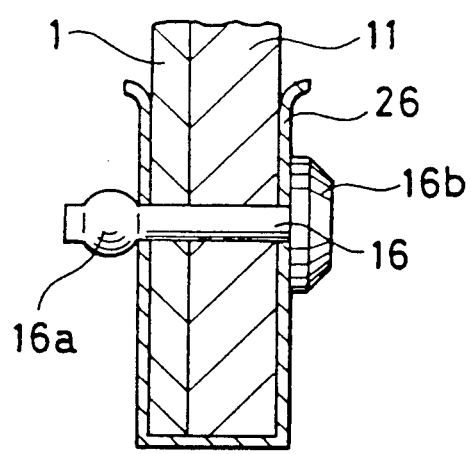
Figure 11B:
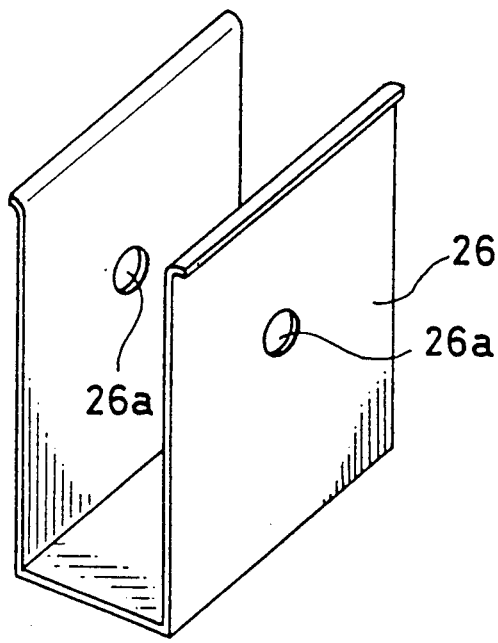
FIG. 11B is a perspective view for an inserting plate.

(6) As shown in FIG. 11A (cross sectional view) and FIG. 11B (perspective view for the inserting plate 26), an inserting plate 26 of a substantially U-shaped cross section having rivet inserting holes 26a is used such that the plate 26 is put between the deformed portion 16a of the rivet 16 and the retainer 1. Since the inserting plate 26 also serves as a plate on the side of a rivet head 16b, there is no requirement for using the plate on the side of the head 16b.

Description will then be made to the attaching structure between the retainer of the present invention and the steering portion.

Since the retainer is made of the synthetic resin-impregnated paper and has a possibility of deformation also in the bolt clamping portion with a steering like the module cover attaching portion as described above, a reinforcing structure is preferably used.

As shown in FIGS. 1A and 1B, in a retainer fixed at two points (having retainer attaching holes 6 at two positions), the following attaching structures (1)–(4) are preferred. In FIGS. 12 through 15 referred to for (1)–(4), there are shown a retainer 1, a reinforcing plate 7, a module cover 11, an attaching tool 18 on the side of steering and a bolt 19.

Figure 12:
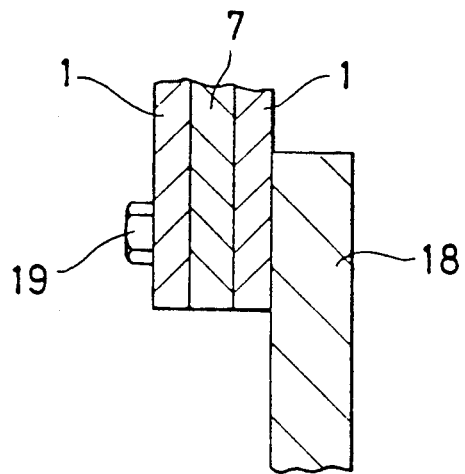
FIGS. 12, 13, 14, 15, 16, 17, 18, 19 and 20 are, respectively, cross sectional views showing structures for attaching to a steering portion.

(1) As shown in FIG. 12, a reinforcing plate 7 is inserted to reinforce the retainer 1 for reinforcing a clamping portion of a bolt 19 with an attaching tool 18 on the side of steering.

Figure 13:
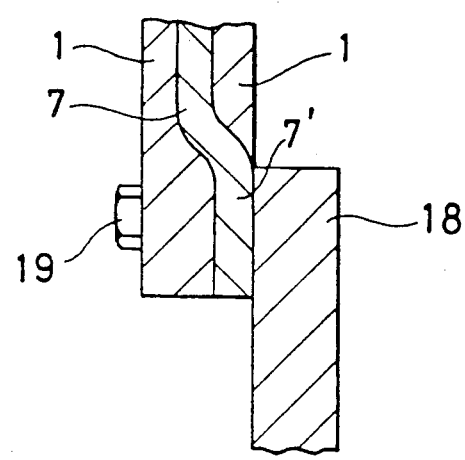

(2) As shown in FIG. 13, a reinforcing plate 7 inserted into a retainer 1 is bent toward an attaching tool 18 on the side of steering such that end 7' of the plate 7 is exposed to the abutting surface of the attaching tool on the side of steering, thereby reinforcing the clamping portion of a bolt 19 with an attaching tool 18.

Figure 14:
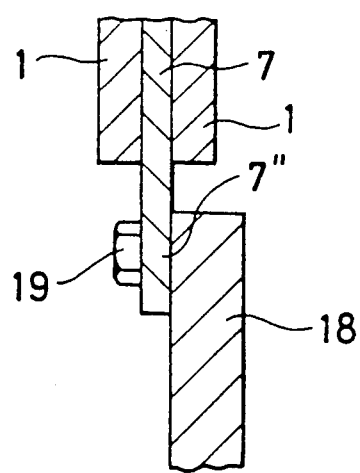

(3) As shown in FIG. 14, an end 7" of a reinforcing plate 7 inserted into a retainer 1 is extended from the end of the retainer 1, and the extended end 7" and an attaching tool 18 on the side of steering are clamped by means of a bolt 19.

Figure 15:
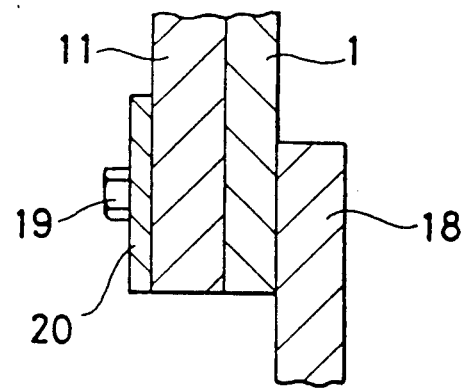

(4) As shown in FIG. 15, a plate 20, a module cover 11, a retainer 1 and an attaching tool 18 on the side of steering are clamped by means of a bolt 19, and the retainer 1 is reinforced by putting it between the module cover 11 and the attaching tool 18 on the side of steering.

Figure 16:
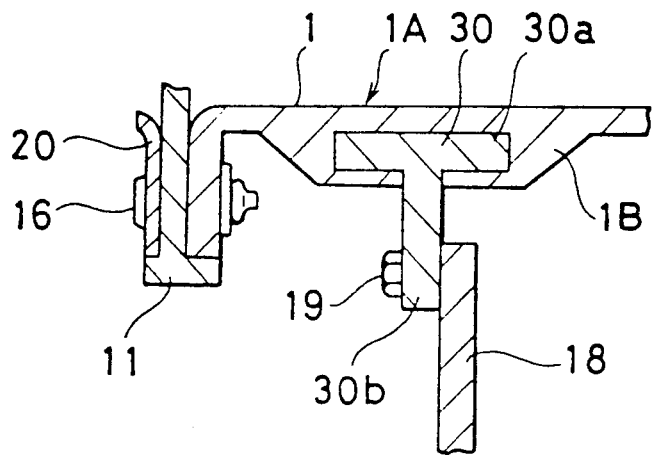

In addition, as a method of using a steering attaching bracket, there is a structure as shown in FIG. 16. In the attaching structure shown in FIG. 16, a thick wall portion 1B is formed to a main panel 1A of a retainer 1, a base end 30a of a steering attaching bracket 30 of T-shaped cross section is embedded into the thick wall portion 1B, and an attaching tool 18 on the side of a steering is clamped to the top end 30b of the bracket 30 by means of a bolt 19. In a case of embedding a steering attaching bracket 30, since a structure in which the thickness is partly enlarged can be obtained easily by forming a thick wall portion, etc. in the retainer made of a synthetic resin-impregnated paper in the present invention, it is possible to insert a member such as a bracket of a large thickness. In FIG. 16, are also shown a module cover 11, a rivet 16 and a plate 20.

The attaching structure of embedding the steering attaching bracket can be applied to four points (a structure of attaching the steering and the retainer at four positions by means of bolt clamping).

Description will then be made to a steering attaching structure suitable to the four-point fixing structure.

Figure 17:
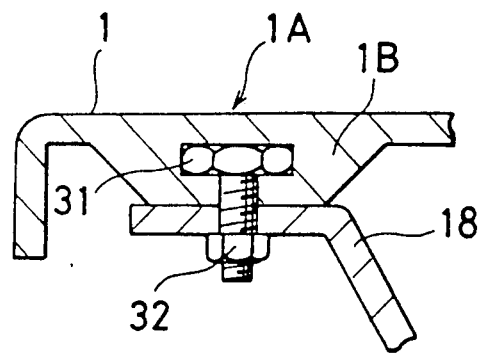

In the structure shown in FIG. 17, a thick wall portion 1B is disposed to a main panel 1A of a retainer 1, in which a bolt 31 is embedded and an attaching tool 18 on the side of steering is fixed to the bolt 31 by using a nut 32.

Figure 18:
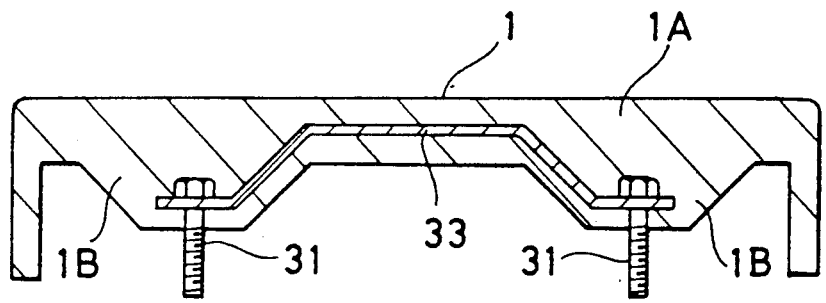

In the structure shown in FIG. 18, a reinforcing plate 33 is inserted into a main panel 1A of a retainer 1 to reinforce the embedded portion of a bolt 31 in the bolt embedding structure shown in FIG. 17.

Figure 19:
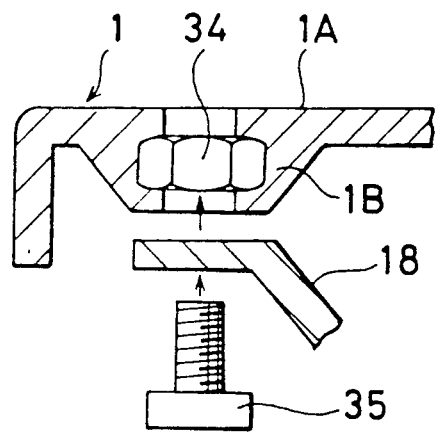

In the structure shown in FIG. 19, a nut 34 is embedded into a thickness wall portion 1B of a main panel 1A of a retainer 1 and an attaching tool 18 on the side of a steering is attached to the nut 34 by using a bolt 35.

Figure 20:
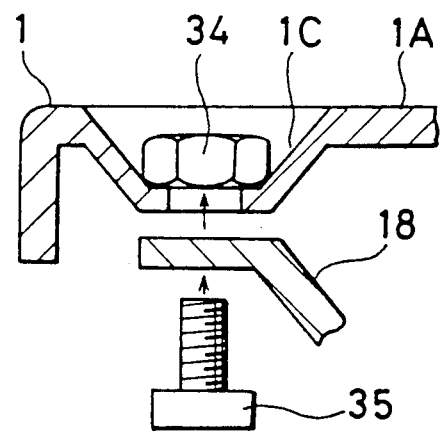

As shown in FIG. 20, the nut 34 may be placed on a recess 1C formed in the main panel A of the retainer 1, but the nut-embedded structure as shown in FIG. 19 is preferred in view of the attaching strength.

In any of the bolt-embedded structure or nut-embedded structure described above, since the wall thickness can easily be changed in the retainer according to the present invention, there is no worry that insert parts may directly abut against a cover or a bag to damage them, which is extremely advantageous.

As has been described above specifically, by the retainer used for an air bag according to the present invention, various advantageous effect can be obtained as shown below:

(1) Since the weight of the retainer is reduced, an operation in retainer-attaching becomes easy; and as a result, this invention's productivity can be improved.
(2) The weight of the air bag attaching structure can be reduced.
(3) Vibrations and inertia moments can be reduced with the reason as described in (2) above and the steering performance can be improved.
(4) Coating for the retainer is no more required to reduce the production cost.
(5) Since the retainer has excellent shape adaptibility, a retainer of desired shape and strength can be manufactured with ease.
(6) Sealing at the abutting portion between the retainer and the inflator can be saved.

By using the retainer inserted with the reinforcing material, strength at required portions can be improved remarkably.

What is claimed is:

1. A retainer used for an air bag adapted to be attached to an inflator, comprising,
a rectangular main panel having a central hole therein and four side edges, said inflator being inserted into the central hole, and
four side walls extending downwardly from the four side edges of the main panel, side portions of the adjacent side walls being connected together, two side walls among the four side walls facing each other having fingers extending further downwardly therefrom, said main panel and four side walls being integrally connected to each other to form a box shape with a bottom opening and formed of thermoplastic synthetic resin-impregnated paper to be light in weight and so that when the air bag is opened, the thermoplastic synthetic resin of the retainer, having a melting temperature lower than the temperature produced by the inflator during inflation, is melted by heat of the inflator upon expansion of the air bag to form a seal between the retainer and the inflator.

2. A retainer used for an air bag as defined in claim 1, wherein said main panel further includes a plurality of small holes around the central hole, said side walls having a plurality of small holes, and said fingers having a hole therein for attaching the retainer to other members.

3. A retainer used for an air bag as defined in claim 1, wherein a reinforcing member is inserted.

4. A retainer used for an air bag as defined in claim 1, wherein the synthetic resin-impregnated paper is prepared by impregnating paper with a synthetic resin.

5. A retainer used for an air bag as defined in claim 1, wherein the synthetic resin-impregnated paper is prepared by molding one or more of materials selected from the group consisting of synthetic pulp, natural pulp, paper dust, wood dust, wood fiber, cellulose fiber, ceramic fiber and glass fiber, with a synthetic resin.

6. A retainer used for an air bag as defined in claim 1, wherein the synthetic resin-impregnated paper contains one of reinforcing fibers and reinforcing particles.

7. A retainer used for an air bag as defined in claim 3, wherein the reinforcing member is one of a plate and a net made of one of synthetic resin, rubber and metal.

8. A retainer used for an air bag as defined in claim 3, wherein the reinforcing member is a plate-like member with thickness of from 10 um to 4 mm.

9. A retainer used for an air bag as defined in claim 1, wherein a reinforcing layer made of a synthetic resin coating is formed at the surface.

10. A retainer used for an air bag as defined in claim 1, wherein the thickness is from 2 to 5 mm.

11. A retainer used for an air bag as defined in claim 10, wherein the thickness is from 2.3 to 2.7 mm.

12. A retainer used for an air bag as defined in claim 1, wherein the synthetic resin-impregnated paper contains from 1 to 1000 parts by weight of a resin based on 100 parts by weight of paper ingredients not containing the resin.

13. A retainer used for an air bag as defined in claim 1, wherein the synthetic resin-impregnated paper contains from 5 to 200 parts by weight of a resin based on 100 parts by weight of paper ingredients not containing the resin.

14. A retainer used for an air bag as defined in claim 1, wherein the thermosetting resin is one of epoxy resin, polyester resin and acryl resin.

15. A retainer used for an air bag adapted to be attached to a steering portion and retained in a cover, said retainer holding an inflator therein and a mounting ring thereon, said air bag being disposed above the retainer and inside the cover, comprising,
a rectangular main panel including a central hole therein, said inflator being inserted into the central hole, a plurality of first small holes arranged around the central hole, said first small holes being used for attaching the mounting ring to the main panel, and four side edges, and
four side walls extending downwardly from the four side edges of the main panel, said side walls being connected together at side portions thereof and having a plurality of second small holes adapted to receive rivets therein for attaching the cover to the retainer, two side walls among the four side walls facing to each other having fingers extending downwardly therefrom, each finger having a third hole therein adapted to receive a bolt therein for attaching the retainer to the steering portion, said main panel and four side walls being integrally connected together to form a box shape with a bottom opening and formed of thermoplastic synthetic resin-impregnated paper so that when the air bag is opened, the thermoplastic synthetic resin of the retainer, having a melting temperature lower than the temperature produced by the inflator during inflation, is melted by heat of the inflator upon expansion of the air bag to seal between the retainer and the inflater.

16. A retainer used for an air bag as defined in claim 15, further comprising a round reinforcing plate situated in the main panel and having a plurality of small holes corresponding to the first small holes, and four side reinforcing plates situated in the four side walls, respectively and having a plurality of small holes corresponding to the second small holes and third holes, said reinforcing plates being retained inside the main panel and the four side walls to strengthen the same.

17. A retainer used for an air bag as defined in claim 15, further comprising means for reinforcing the second small holes of the side wall installed on an inner side of the side wall, said reinforcing means having at least one hole corresponding to one of the plurality of second small holes one of said rivets, when installed, passing through said one of the plurality of second small holes and the hole of the reinforcing means and being deformed so that the deformed portion does not pass the hole of the reinforcing means.

* * * * *